(12) United States Patent
Hengsperger et al.

(10) Patent No.: US 9,783,443 B2
(45) Date of Patent: Oct. 10, 2017

(54) TREATMENT OF WATER TO EXTEND HALF-LIFE OF OZONE

(75) Inventors: Steve L. Hengsperger, Tecumseh (CA); Justin L. Namespetra, Essex (CA); Jamie O'Neil, Woodslee (CA)

(73) Assignee: TERSANO INC., Oldcastle (CA)

( * ) Notice: Subject to any disclaimer, the term of this patent is extended or adjusted under 35 U.S.C. 154(b) by 0 days.

(21) Appl. No.: 14/239,368

(22) PCT Filed: Aug. 20, 2012

(86) PCT No.: PCT/CA2012/050572
§ 371 (c)(1),
(2), (4) Date: Feb. 18, 2014

(87) PCT Pub. No.: WO2013/026159
PCT Pub. Date: Feb. 28, 2013

(65) Prior Publication Data
US 2014/0175017 A1    Jun. 26, 2014

Related U.S. Application Data

(60) Provisional application No. 61/527,284, filed on Aug. 25, 2011.

(51) Int. Cl.
*C02F 9/00* (2006.01)
*B01F 3/04* (2006.01)
(Continued)

(52) U.S. Cl.
CPC ............ *C02F 9/00* (2013.01); *B01F 3/04985* (2013.01); *B01J 39/05* (2017.01); *B01J 39/07* (2017.01);
(Continued)

(58) Field of Classification Search
None
See application file for complete search history.

(56) References Cited

U.S. PATENT DOCUMENTS 3,696,125 A * 10/1972 Jansen ................ C07D 307/64
534/652
4,306,079 A * 12/1981 Gutierrez ............ C07D 305/12
549/263
(Continued)

FOREIGN PATENT DOCUMENTS

JP    S56 15897 A    2/1981
JP    H06-142662     5/1994
(Continued)

OTHER PUBLICATIONS

Office Action dated Jul. 10, 2014 issued on corresponding Japanese Application No. 2014-526347 with English translation.
(Continued)

*Primary Examiner* — Chester Barry
(74) *Attorney, Agent, or Firm* — Borden Ladner Gervais LLP; David A. Nauman

(57) ABSTRACT

A system for providing an acidic ionized ozonated liquid. The system includes a liquid inlet arranged to accept a liquid into the system; an acid-based cation-exchange resin in fluid communication with the liquid inlet, the resin adapted to exchange cations in the accepted liquid with H+ ions on the resin; an ozone dissolving apparatus in fluid communication with the liquid inlet and the acid-based cation-exchange resin; and a liquid outlet in fluid communication with the liquid inlet, the acid-based cation-exchange resin and the ozone dissolving apparatus. The ozone dissolving apparatus and the acid-based cation-exchange resin cooperating to produce the acidic ionized ozonated liquid for dispensation out of the system via the liquid outlet.

25 Claims, 5 Drawing Sheets

(51) Int. Cl.

| | | |
|---|---|---|
| *B01J 39/20* | (2006.01) | |
| *B01J 47/022* | (2017.01) | |
| *C01B 13/11* | (2006.01) | |
| *C02F 1/78* | (2006.01) | |
| *B01J 39/05* | (2017.01) | |
| *B01J 39/07* | (2017.01) | |
| *B01J 49/06* | (2017.01) | |
| *B01J 49/53* | (2017.01) | |
| *C02F 1/42* | (2006.01) | |

(52) U.S. Cl.
CPC ............ *B01J 39/20* (2013.01); *B01J 47/022* (2013.01); *B01J 49/06* (2017.01); *B01J 49/53* (2017.01); *C01B 13/11* (2013.01); *C02F 1/42* (2013.01); *C02F 1/78* (2013.01); B01F 2003/04886 (2013.01); C01B 2201/22 (2013.01); C01B 2201/64 (2013.01); C02F 2001/425 (2013.01); C02F 2209/06 (2013.01)

(56) References Cited

U.S. PATENT DOCUMENTS

| | | | |
|---|---|---|---|
| 5,431,861 A | 7/1995 | Nagahiro et al. | |
| 5,935,441 A * | 8/1999 | O'Neill | C02F 1/32 210/638 |
| 6,458,242 B1 * | 10/2002 | Bokstrom | D21C 9/1036 162/40 |
| 6,786,976 B1 * | 9/2004 | Gottschalk | B08B 3/04 134/1 |
| 6,964,739 B2 | 11/2005 | Boyd et al. | |
| 2002/0153319 A1 * | 10/2002 | Mukhopadhyay | B01D 61/022 210/652 |
| 2002/0185423 A1 * | 12/2002 | Boyd | A61L 2/183 210/167.3 |
| 2003/0018140 A1 * | 1/2003 | Havlicek | C01B 15/0135 525/383 |
| 2004/0050794 A1 * | 3/2004 | Ahmed | B01J 39/043 210/681 |
| 2011/0027154 A1 * | 2/2011 | Chapman | B01D 53/9418 423/213.2 |
| 2011/0180491 A1 * | 7/2011 | Tokoshima | B01D 19/0031 210/762 |

FOREIGN PATENT DOCUMENTS

| | | |
|---|---|---|
| JP | H06142662 A | 5/1994 |
| JP | H09-10769 | 1/1997 |
| JP | H09010769 A | 1/1997 |
| JP | 10-330976 | 12/1998 |
| JP | H11-106976 | 4/1999 |
| JP | 2006-150215 | 6/2006 |
| JP | 2010-209370 | 9/2010 |
| JP | 2011-157580 | 8/2011 |
| WO | 2013026159 A1 | 2/2013 |

OTHER PUBLICATIONS

Glaze, William H. "Drinking-water treatment with ozone," Environmental Science & Technology, vol. 21, No. 3, pp. 224-230.

Extended European Search Report and Opinion dated May 26, 2015 for corresponding European Application No. 12826053.6.

International Search Report and Written Opinion for corresponding International Application No. PCT/CA2012/050572 dated Nov. 9, 2012.

Office Action, dated May 17, 2013, for corresponding Canadian Patent No. 2,802,785.

Ericksson, M. "Ozone Chemistry in Aqueous Solution" 2005 Licentiate Thesis, Dept. of Chemistry, Royal Institute of Technology, Stockholm, Sweden.

Uhm HS, et al. "Increase in the ozone decay time in acidic ozone water and its effects on sterilization of biological warfare agents", J. Hazard Mater. Sep. 15, 2009:168(2-3):1595-601, epub Mar. 21, 2009.

Notification of Decision of Rejection issued Oct. 22, 2014 on corresponding Japanese Patent Application No. 2014-526347 with English translation.

First Office Action dated May 25, 2015 issued on corresponding Chinese Patent Application No. 201280052029.3, with English translation.

First Office Action dated Sep. 4, 2015 issued on corresponding Russian Patent Application No. 2014111067, with English summary.

First Office Action dated Jul. 8, 2015 issued on corresponding Colombian Patent Application No. 14-057.043, with English translation.

First Office Action dated Aug. 24, 2015 issued on corresponding Australian Patent Application No. 2012300163.

Second Office Action issued on the corresponding Chinese application No. 201280052029.3 dated Feb. 5, 2016, with English translation.

Second Office Action issued on the corresponding Colombian application No. 14-057.043 dated Dec. 21, 2015, with English translation.

Notice of Acceptance issued on the corresponding Australian application No. 2012300163 dated Feb. 16, 2016.

First Office Action issued on the corresponding Japanese application No. 2015-031733 dated May 26, 2016, with English translation.

* cited by examiner

TREATMENT OF WATER TO EXTEND HALF-LIFE OF OZONE

CROSS REFERENCE TO RELATED APPLICATIONS

This application is a §371 national stage entry of PCT/CA2012/050572, filed Aug. 20, 2012, which claims the benefit of priority of U.S. Provisional Patent Application No. 61/527,284 filed Aug. 25, 2011, which is incorporated herein by reference in its entirety.

FIELD

The present disclosure relates generally to methods and systems for producing ozonated water. More particularly, the present disclosure relates to ozonation methods and systems that treat water in the production of ozonated water.

BACKGROUND

Ozone is a naturally occurring allotrope of oxygen. It has been known and used as an oxidant and disinfectant. In aqueous solutions, ozone is capable of killing bacteria in seconds at appropriate concentrations. It is often desirable to use ozone as a disinfecting or sanitizing agent as it imparts no odor and leaves no residue. The sanitizing properties of ozone dissolved in water, as well as its lack of odor and residue, make such a solution desirable to use for cleaning and disinfecting. Ozonated water can be used to disinfect or sanitize in both commercial and home settings. For example, ozonated water can be used to disinfect or sanitize bathroom counters, produce, dishes and cutlery, or floors.

One convenient method for using ozone as a disinfectant or sanitizer is to dissolve it in water or a water based solution. The stability of ozone is often a complicating factor in its use as a disinfecting or sanitizing agent since the high reactivity of ozone, which imparts its disinfecting and sanitizing properties, also results in reaction with reducing agents and, therefore, decomposition. Ozone in ozonated water, produced in anticipation of demand, will eventually decompose and return to being non-ozonated water.

Ozonation systems for producing ozonated water suitable for cleaning, disinfecting or sanitizing may be recirculating or non-recirculating systems.

Recirculating ozonation systems are designed with a tank of water and a recirculating ozonating flow path. The water flows through the ozonating flow path and dissolves an amount of ozone therein. Low efficiency in the ozonating flow path results in the need to recirculate the ozonated water back through the ozonation flow path in order to achieve the desired amount of dissolved ozone. This is typically achieved by recirculating the ozonated water back into the tank of water and running the ozonation system for a period of time until all the water in the tank is sufficiently ozonated.

Ozonation systems have addressed the delay between (a) starting the system and (b) delivery of ozonated water having a usable level of ozone, by increasing the efficiency of the ozonating flow path and/or by using a continuously recirculating system.

It is possible to produce ozonated water "on demand" using a continuously recirculating ozonation system. Continuously recirculating ozonation systems have an ozonation flow path that recirculates ozonated water back to the holding tank, and the system ozonates the water in the system regardless of whether ozonated water is being dispensed. In such systems, ozone is continuously added to the water to replace any ozone that has decomposed, or to ozonate any fresh water that has been added to replace ozonated water removed from the system. A steady-state of ozonated water is eventually reached based on the inlet and outlet flow rates, as well as the efficiency of the ozonation flow path used in the ozonation system. However, at the start of ozonation, the level of dissolved ozone is low and gradually increases until the steady-state is achieved.

It is also possible to use a non-recirculating ozonation system. Such systems dispense ozonated water "on demand" without the need for a continuously recirculating system. That is, non-recirculating ozonation systems dispenses ozone which has been added to the water via a single pass through the ozonating flow path, thereby doing away with the need for a holding tank.

In both recirculating and non-recirculating ozonation systems, regardless of whether the systems dispense ozonated water "on demand", it is desirable to increase the concentration of dissolved ozone and reduce the rate of ozone decomposition.

Various factors impact the rate of ozone decomposition (Ericksson, M. "Ozone Chemistry in Aqueous Solution" 2005 Licentiate Thesis, Dept. of Chemistry, Royal Institute of Technology, Stockholm, Sweden; and Uhm H S, et al. "Increase in the ozone decay time in acidic ozone water and its effects on sterilization of biological warfare agents", J. Hazard Mater. 2009 Sep. 15; 168(2-3):1595-601, epub 2009 Mar. 21). For example, increases in temperature, increases in speed of stirring, and higher ionic strength all accelerate the rate of ozone decomposition in aqueous solutions. In contrast, addition of radical scavengers or other stabilizers (for example, micellar surfactants), and decreasing the pH of the solution using acidic buffer systems, stabilize the ozone and reduce the rate of ozone decomposition.

Using distilled or deionized water (DI water) is understood to be beneficial when producing ozonated water. Ozonation systems that use corona discharge preferably use deionized water since ions present in tap water may "poison" the ozone cell and shorten its lifespan (see U.S. Pat. No. 6,964,739). One example of an ozonolysis system which uses DI water is the LIQUOZON® Ultra—Ozone Sanitization of DI Water Loop and Storage Tank, manufactured by MKS Instruments. The LIQUOZON® Ultra ozonated DI water unit is an automated ozone injection system used for the sanitization of process water systems, storage tanks and distribution lines.

It is desirable to provide a method and system for treating water so that, in comparison to untreated water, the average ozone decomposition rate in the treated water is reduced.

SUMMARY

The present disclosure provides a method and system for treating water so that, in comparison to untreated water, the average ozone decomposition rate in the treated water is reduced. As a consequence of a reduced decomposition rate, the average life span of the dissolved ozone in the treated water is increased. In one aspect, the present disclosure provides a system for providing an acidic ionized ozonated liquid. The system includes a liquid inlet arranged to accept a liquid into the system; an acid-based cation-exchange resin in fluid communication with the liquid inlet, the resin adapted to exchange cations in the accepted liquid with $H^+$ ions on the resin; an ozone dissolving apparatus in fluid communication with the liquid inlet and the acid-based cation-exchange resin; and a liquid outlet in fluid communication with the liquid inlet, the acid-based cation-exchange resin and the ozone dissolving apparatus. The ozone dissolving apparatus and the acid-based cation-exchange resin cooperating to produce the acidic ionized ozonated liquid for dispensation out of the system via the liquid outlet.

The ozone in the dispensed ozonated liquid may have an average life span which is: greater than the average life span of ozone in liquid which is not treated with the acid-based cation-exchange resin and is treated with sufficient liquid acid to produce a pH equal to the pH of the dispensed acidic ionized ozonated liquid; and greater than the average life span of ozone in a deionized liquid which is treated with sufficient liquid acid to produce a pH equal to the pH of the dispensed acidic ionized ozonated liquid.

The ozone dissolving apparatus may be an ozonating flow path which comprises: an ozone generator to produce ozone for mixing with the accepted liquid. The ozonating flow path may further comprise a mixer, in fluid communication with the ozone generator, to mix the generated ozone and the accepted liquid to produce the ozonated liquid.

The system may also include a holding tank where the acid-based cation-exchange resin is located in a recirculating flow path that is adapted to recirculate liquid to the holding tank. Alternatively, the system may also include a holding tank and the acid-based cation-exchange resin may be located in the holding tank.

Alternatively, the system may have the acid-based cation-exchange resin located in a non-recirculating flow path. Such a system may also include a holding tank and the non-recirculating flow path may provide liquid to the holding tank. Alternatively, the non-recirculating flow path may provide liquid to the ozone dissolving apparatus.

Any of the previously described systems may have the acid-based cation-exchange resin accept liquid from the liquid inlet and the ozone dissolving apparatus accept liquid treated by the resin. Alternatively, any of the previously described systems may have the ozone dissolving apparatus accept liquid from the liquid inlet and the acid-based cation-exchange resin accept the ozonated liquid.

The acid-based cation-exchange resin may be a strong acid resin. The acid-based cation-exchange resin may be a weak acid resin.

The cations in the accepted liquid may be present in the liquid when the liquid is accepted by the ozonation system, or may be added to the liquid by the ozonation system.

In another aspect, there is provided a method for producing an acidic ionized ozonated liquid. The method includes exchanging cations present in the liquid with H+ ions from an acid-based cation-exchange resin; and ozonating the liquid. Exchanging the cations and ozonating the liquid together produce the acidic ionized ozonated liquid.

The liquid may be ozonated after the cations are exchanged. The liquid may be ozonated before the cations are exchanged.

The ozone in the ozonated liquid produced using a method as described above may have an average life span which is: greater than the average life span of ozone in liquid which is not treated with the acid-based cation-exchange resin and is treated with sufficient liquid acid to produce a pH equal to the pH of the acidic ionized ozonated liquid; and greater than the average life span of ozone in a deionized liquid which is treated with sufficient liquid acid to produce a pH equal to the pH of the acidic ionized ozonated liquid.

The method may also include adding cations to the received liquid before the cations are exchanged.

In yet another aspect, there is provided a system for increasing the average life span of ozone dissolved in a liquid. The system includes: an acid-based cation-exchange resin, the resin adapted to exchange cations in the liquid with H+ ions on the resin; and an ozone dissolving apparatus in fluid communication with the acid-based cation-exchange resin, the ozone dissolving apparatus and the acid-based cation-exchange resin cooperating to produce an acidic ionized ozonated liquid. The ozone in the acidic ionized ozonated liquid has an average life span which is: greater than the average life span of ozone in liquid which is not treated with the acid-based cation-exchange resin and is treated with sufficient liquid acid to produce a pH equal to the pH of the acidic ionized ozonated liquid; and greater than the average life span of ozone in a deionized liquid which is treated with sufficient liquid acid to produce a pH equal to the pH of the acidic ionized ozonated liquid.

In still another aspect, there is provided a method for increasing the average life span of ozone dissolved in a liquid. The method includes: exchanging cations present in the liquid with H+ ions from an acid-based cation-exchange resin; and ozonating the liquid, where exchanging the cations and ozonating the liquid together produce an acidic ionized ozonated liquid. The ozone in the resulting acidic ionized ozonated liquid has an average life span which is: greater than the average life span of ozone in liquid which is not treated with the acid-based cation-exchange resin and is treated with sufficient liquid acid to produce a pH equal to the pH of the acidic ionized ozonated liquid; and greater than the average life span of ozone in a deionized liquid which is treated with sufficient liquid acid to produce a pH equal to the pH of the acidic ionized ozonated liquid.

Other aspects and features of the present disclosure will become apparent to those ordinarily skilled in the art upon review of the following description of specific examples in conjunction with the accompanying figures.

BRIEF DESCRIPTION OF THE DRAWINGS

Examples of the present disclosure will now be described, by way of illustration only, with reference to the attached Figures.

DETAILED DESCRIPTION

Generally, the present disclosure provides a method and system for treating an aqueous solution (for example, water)

so that, in comparison to ozone dissolved in untreated aqueous solution, the ozone decomposition rate in the treated solution is reduced and the average life span of the dissolved ozone in the treated solution is increased.

For the purposes of this description, the terms "aqueous solution", "liquid" and "water" are used interchangeably, though water is one example of an aqueous solution which may be treated using the acid-based cation-exchange resin of embodiments described herein.

An ozonation system, and a method of producing an ozonated aqueous solution, according to an embodiment of the present disclosure includes an acid-based cation-exchange resin that removes cationic species from the aqueous solution and replaces the removed cationic species with $H^+$ ions, thereby reducing the pH of the aqueous solution (i.e. increasing the acidity) and producing an acidic ionized solution. The methods and systems according to the present disclosure use the acid-based cation exchange resins and an ozone dissolving apparatus to produce acidic ionized ozonated liquids.

To generate acidic ionized ozonated liquids, liquids which are accepted by the acid-based cation exchange resins include cations dissolved therein in order to provide cations which can be exchanged with $H^+$ ions on the resin. The cations dissolved in the liquid may be present in the source of liquid accepted by the ozonation system, or may be added by the ozonation system. For example, the ozonation system may accept a source of water having a small amount of cations and may add additional cations by adding a solution of NaCl to the water.

Additionally, it would be understood that methods and systems according to the present disclosure do not include anion exchange resins that generate $^-OH$ ions since such $^-OH$ ions would react with the added $H^+$ ions to generate a neutral, non-ionized solution.

Figure 1:
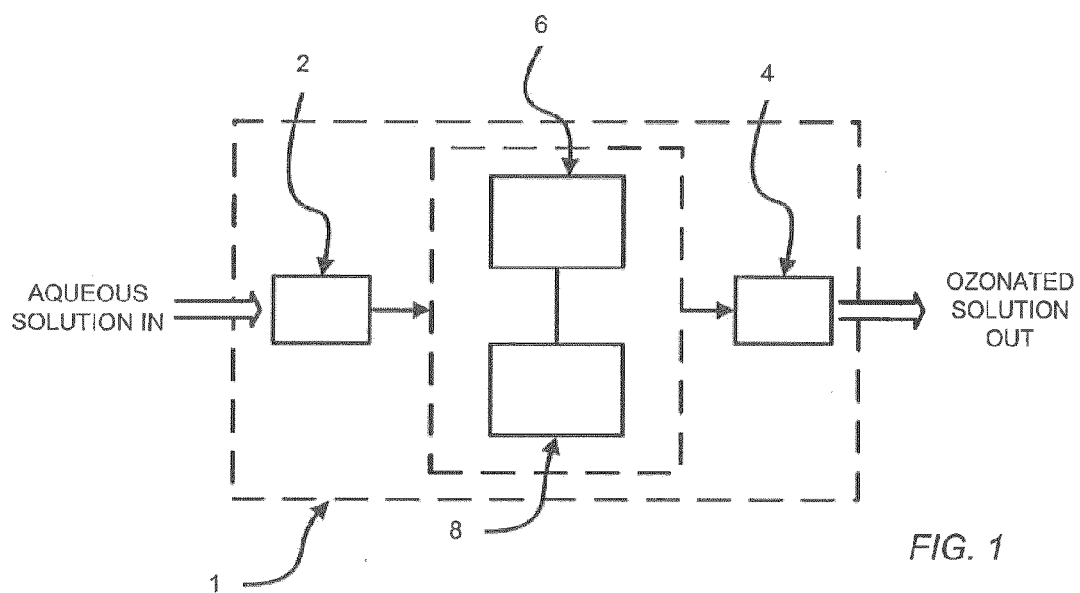
FIG. 1 is an illustration of a system for providing ozonated liquid according to the present disclosure.

An ozonation system according to an embodiment of the present disclosure is illustrated in FIG. 1. As seen in FIG. 1, the ozonation system 1 includes an inlet 2 for accepting a liquid into the system; a liquid outlet 4 for dispensing ozonated liquid out of the system, the liquid outlet 4 being in fluid communication with the liquid inlet 2; an acid-based cation-exchange resin 6 in fluid communication with the liquid inlet 2 and liquid outlet 4; and an ozone dissolving apparatus 8 in fluid communication with the liquid inlet 2, the liquid outlet 4 and the acid-based cation-exchange resin 6. The ozonation system is adapted to: exchange cations in the accepted liquid with $H^+$ ions on the acid-based cation-exchange resin 6; and ozonate the accepted liquid using the ozone dissolving apparatus 8 to produce an acidic ionized ozonated liquid to be dispensed out of liquid outlet 4.

Experimental Results. It has been found that treatment of an untreated cation containing liquid, for example tap water, with an acid-based cation-exchange resin and a source of ozone results in an ozonated solution that has an ozone decomposition rate which is reduced (and, thus, an average life span for the dissolved ozone which is increased) when compared to: 1) untreated tap water, 2) deionized water, 3) acidified tap water, and 4) acidified deionized water. Deionized water was produced using a mixed bed deionizing cartridge with a carbon block pre-filter. Ozone was produced using corona discharge, at a current of 1 Amp and a flow rate between 2.5 to 3 gallons/minute of cold tap water. Ozone concentration was measured using a Micro 7+ dissolved ozone measuring system. The half-life of the five different aqueous solutions are shown in Tables 1 and 2, below.

TABLE 1

Ozone half-life for weak-acid treated water

| Treatment - Weak Acid | Initial ozone conc. (ppm) | Ozone half life |
|---|---|---|
| Untreated tap water | 0 | 20 min |
| Deionized tap water | 0.4 | 5 min |
| Tap water treated with Acetic Acid (pH 4.65) | 1.56 | 40 min |
| Deionized tap water treated with Acetic Acid (pH 3.4) | 1.24 | 1.5 hours |
| Tap water treated with weak acid cation-exchange resin (pH 5.2) | 1.42 | 2 hours |

TABLE 2

Ozone half-life for strong-acid treated water

| Treatment - Strong Acid | Initial ozone conc. (ppm) | Ozone half life |
|---|---|---|
| Untreated tap water | 0 | 20 min |
| Deionized tap water | 0.4 | 5 min |
| Tap water treated with HCl (pH 3.26) | 1.35 | 3.5 hours |
| Deionized tap water treated with HCl (pH 2.7) | 1.08 | 4 hours |
| Tap water treated with strong acid cation-exchange resin (pH 3.15) | 1.68 | 6 hours |

As can be seen in Tables 1 and 2, treatment of tap water using an acid-based cation-exchange resin and ozonation of the solution results in an increase in ozone half life that is greater than the ozone half life in other solutions of similar pH's which have not been treated with the acid-based cation-exchange resin.

This is surprising since, according to Ericksson and Uhm, as discussed in the Background section, one would expect that all solutions with similar pH's would have a similar ozone half life, and that solutions with lower pH's would have longer ozone half lives.

However, as seen in Table 1, the tap water treated with the weak acid cation-exchange resin provides a longer ozone half life (2 hours vs. 40 minutes), even though the solution produced using the weak acid cation exchange resin less acidic than the solution of tap water generated using acetic acid (AcOH) (pH 5.2 vs. 4.65).

Additionally, as can be seen in Tables 1 and 2, the tap water treated with strong acid cation-exchange resin results in an ozone half life which is significantly longer than the ozone half life in deionized water, even though both solutions are of a very similar pH. Deionized tap water treated with acetic acid to result in a pH of 3.4 would, if half life was determined by pH, be expected to have an ozone half life which was similar to tap water treated with strong acid cation-exchange resin and resulting in a pH of 3.15. However, this is not the case since the deionized tap water at pH 3.4 has an ozone half life of 1.5 hours, while the tap water treated with strong acid cation-exchange resin at pH 3.15 has an ozone half life of 6 hours.

In a similar vein, according to U.S. Pat. No. 6,964,739, it is beneficial to use deionized water in ozone production. However, deionized water by itself results in a very short ozone half life (5 minutes), and deionized water treated with acid provides an ozone half life that is shorter than tap water treated with the corresponding acid-based cation exchange resin. This is true even when the pH of the deionized water treated with acid is lower than the pH of the tap water treated with acid-based cation exchange resin. As may be seen: weak acids: pH 3.4 (DI water) vs. 5.2 (cation exchange resin-treated) corresponds to half lives of 1.5 hours vs. 2 hours; and strong acids: pH 2.7 (DI water) vs. 3.15 (cation exchange resin-treated) corresponds to half lives of 4 hours vs. 6 hours.

As is evident from the data shown above, removing cations from tap water using a mixed bed column to produce deionized water, and then subsequently adding acid to reduce the pH, does not produce a solution equivalent to tap water treated with an acid-based cation exchange resin. The average ozone half life in the tap water treated with an acid-based cation exchange resin is longer than in the acidified deionized water.

As is evidenced by the experimental results discussed above, systems that use an acid-based cation-exchange resin and an ozone dissolving apparatus to cooperatively produce an acidic ionized ozonated liquid generate an solution where the dissolved ozone has an average life span which is: greater than the average life span of ozone in liquid which is not treated with the acid-based cation-exchange resin and is treated with sufficient liquid acid to produce a pH equal to the pH of the acidic ionized ozonated liquid; and greater than the average life span of ozone in a deionized liquid which is treated with sufficient liquid acid to produce a pH equal to the pH of the acidic ionized ozonated liquid.

For the purposes of this description, the term "increasing" or "extending" the average life span of ozone dissolved in an acidic ionized ozonated liquid refers to prolonging the average life span of the ozone in the acidic ionized ozonated liquid when compared to: the average life span of ozone in liquid which is not treated with the acid-based cation-exchange resin and is treated with sufficient liquid acid to produce a pH equal to the pH of the acidic ionized ozonated liquid; and the average life span of ozone in a deionized liquid which is treated with sufficient liquid acid to produce a pH equal to the pH of the acidic ionized ozonated liquid.

For example, as illustrated in Table 2, the average life span of ozone in tap water treated with strong acid cation-exchange resin (pH 3.15) is "increased" or "extended" in when compared to: untreated tap water; tap water treated with HCl (pH 3.26); and deionized tap water treated with HCl (pH 2.7).

In different embodiments, the ozonation system 1 according to the present description may be, for example: a recirculating ozonation system; a recirculating, "on-demand" ozonation system; a non-recirculating, "on-demand" ozonation system; or any other type of ozonation system known in the art. Examples of specific ozonation systems according to embodiments of the present disclosure which include the acid-based cation-exchange resin are discussed in further detail below. The ozone dissolving apparatus according to an embodiment of the present description may be, for example, an ozonating flow path. Examples of ozonating flow paths are discussed in further detail below.

Cation-Exchange Resins

The following discussion relates to embodiments of the acid-based cation-exchange resin 6. Ion exchange resins are often used to separate, purify, and decontaminate solutions. An ion exchange resin is an insoluble matrix which, on the surface of the matrix, includes functional groups that simultaneously trap ions from the solution onto the surface and, in exchange, release ions from the surface into the solution. In such a manner, the treatment of the solution results in an ion exchange between the resin and the solution.

Ion exchange resins are loaded with one ion, which is released into the solution, and may be made to selectively prefer one or more alternative ions, which are removed from solution.

Ion exchange resins are broadly categorized as cation-exchange resins or anion-exchange resins. Cation-exchange resins exchange positively charged ions (i.e. cations), while anion-exchange resins exchange negatively charged ions (i.e. anions).

The order of affinity for some common cations is approximately: $Hg^{2+}<Li^+<H^+<Na^+<K^+\approx NH_4^+<Cd^{2+}<Cs^+<Ag^+<Mn^{2+}<Mg^{2+}<Zn^{2+}<Cu^{2+}<Ni^{2+}<Co^{2+}<Ca^{2+}<Sr^{2+}<Pb^{2+}<Al^{3+}<Fe^{3+}$. Therefore, cation-exchange resins may exchange, for example: a solution based $K^+$ ion for a resin based $Na^+$ ion; or solution based $Ca^{2+}$, $Mg^{2+}$, or $Fe^{3+}$ ions for resin based $Na^+$ or $H^+$ ions.

The order of affinity for some common anions is approximately: $OH^-\approx F^-<HCO_3^-<Cl^-<Br^-<NO_3^-<HSO_4^-<PO_4^{3-}<CrO_4^{2-}<SO_4^{2-}$. Therefore, anion-exchange resins may exchange, for example: a solution based $Cl^-$ ion for a resin based $OH^-$ ion.

Deionized water is water which has been treated with both a cation-exchange resin and an anion-exchange resin, for example in a mixed-bed column, to: (1) remove cations from solution and replaced them with $H^+$ ions, and (2) remove anions from solution and replace them with $OH^-$ ions. The added $H^+$ and $OH^-$ ions react together to form water ($H_2O$), thereby providing the deionized water.

Cation-exchange resins are classified as "strongly acidic" or "weakly acidic", depending on the functional groups on the surface of the resin. Strong acid resins are so named since their propensity to give up an $H^+$ ion is similar to that of strong acids (acids which, for example, have pKa's less than 1). That is, the functional groups of strong acids and strong acid resins easily dissociate to provide the $H^+$ ion. Weak acid resins are so named since their propensity to give up an $H^+$ ion is similar to that of weak acids (acids which, for example, have pKa's greater than 1). The functional groups of weak acids and weak acid resins are less likely to give up an $H^+$ ion than the functional groups of strong acids and strong acid resins.

Strong acid cation-exchange resins may include, for example, sulfonic acid functional groups (pKa≈−2.5). Weak acid cation-exchange resins may include, for example, carboxylic acid groups (pKa≈4.75).

Ozonation systems according to embodiments of the present application include acid-based cation-exchange resins that remove cationic species from the aqueous solution and replace the removed cationic species with $H^+$ ions, thereby reducing the pH of the aqueous solution. The ozonation systems may include a mixture of acid-based cation-exchange resins; for example, the cation-exchange resin may be a strong acid resin, weak acid resin, a mixture of strong acid resins, a mixture of weak acid resins, or any combination thereof. The acid-based cation-exchange resins may be any commercially available acid-based cation-exchange resin.

Alternatively, the acid-based cation-exchange resin may comprise a commercially available cation-exchange resin which is transformed in situ into an acid-based cation-exchange resin. For example, the acid-based cation-exchange resins may be produced or purchased first as cation-exchange resins with ions other than $H^+$, and then transformed into the acid-based cation-exchange resin before being added to the ozonation system. Alternatively, the cation-exchange resin may be transformed into the acid-based cation-exchange resin after the resin is added to the ozonation system, for example by running a regenerating amount of acid through the flow path that contains the resin.

Exemplary resins may be formed from an organic polymer substrate, for example crosslinked polystyrene where the crosslinker may be divinylbenzene; the resins may be formed having pores in the matrix; the resins may be particles or membranes, where the particles may be from less than 30 µm to greater than 800 µm; the resins may have, for example, a capacity greater than 0 and less than 6 milliequivalents per gram.

The acid-based cation-exchange resin may be disposed of after substantially all of the $H^+$ cations have been exchanged, or the acid-based cation-exchange resin may be regenerated by contact with an acid solution.

Ozonation Systems

The present application generally describes methods and ozonation systems which are also described in further detail in U.S. Provisional Application 61/409,274 (filed Nov. 2, 2010) and PCT Application No: PCT/CA2010/001520, filed Sep. 30, 2009, which shares common inventors with the present application, and which are incorporated herein by reference. PCT Application PCT/CA2010/001520 claims priority to U.S. Provisional Applications: U.S. Provisional Application 61/248,102 (filed Oct. 2, 2009); U.S. Provisional Application 61/248,075 (filed Oct. 2, 2009); and U.S. Provisional 61/248,055 (filed Oct. 2, 2009).

Recirculating Ozonation Systems. In one example of an ozonation system according to the present disclosure, the ozonation system incorporates a recirculating ozonating flow path. As discussed above, recirculating ozonation systems are designed with a tank that holds the aqueous solution and a recirculating ozonating flow path. The aqueous solution flows through the ozonating flow path and dissolves an amount of ozone therein. The aqueous solution is recirculated back to the tank.

Figure 2A:
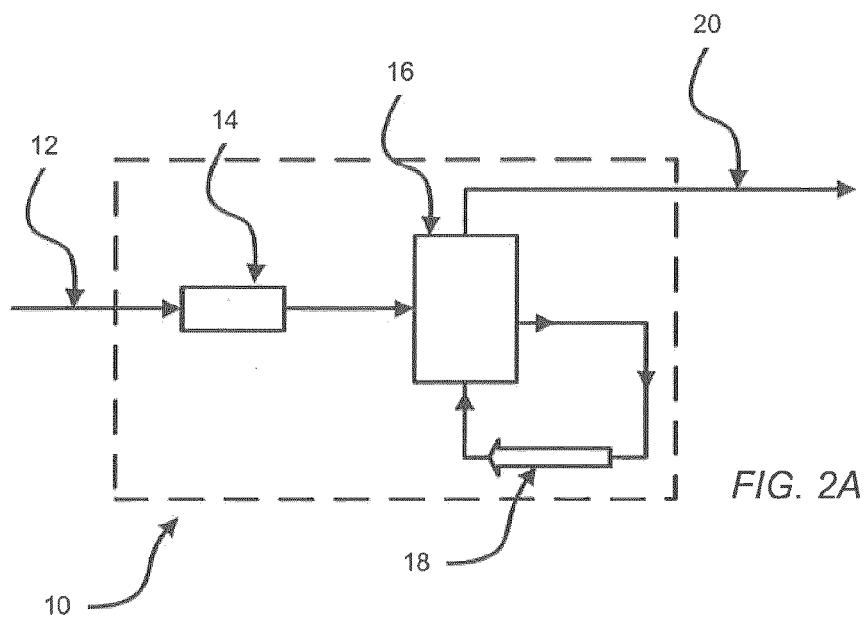
FIG. 2A is an illustration of one example of the system illustrated in FIG. 1.

One specific example of such a recirculating ozonation system is illustrated in FIG. 2A. The recirculating ozonation system 10 includes an inlet 12 for the aqueous solution, an acid-based cation-exchange resin 14 adapted to accept the aqueous solution from the inlet 12 and to treat the aqueous solution by replacing cations in the solution with $H^+$ ions, a holding tank 16 adapted to accept the aqueous solution from the resin 14, an ozonating flow path 18 adapted to dissolve ozone in the aqueous solution and to recirculate the aqueous solution back to the holding tank 16, and outlet 20 adapted to dispense the treated ozonated aqueous solution from the system 10.

A recirculating, ozonation system according to the present disclosure may incorporate the acid-based cation-exchange resin in a number of alternative locations, for example: directly in the ozonating flow path (as illustrated in FIG. 2A); in a recirculating flow path that, for example, recycles the solution from the holding tank to the cation-exchange resin and back to the holding tank; or in the holding tank itself. Alternatively, the ozonation system may include a holding tank that is adapted to accept an aqueous solution which has been treated with the acid-based cation-exchange resin, where the holding tank and the acid-based cation-exchange resin independently may or may not be a part of the ozonating flow path. For example, the aqueous solution may be treated in a first tank, which is not a part of the ozonating flow path, and the treated aqueous solution may then be moved into the holding tank, which is a part of the ozonating flow path. In another example, the aqueous solution may be treated with the acid-based cation-exchange resin by exposing the aqueous solution to the resin as the solution is pumped into the holding tank, where the holding tank is not a part of the ozonating flow path.

Recirculating, "On-demand" Ozonation Systems. In another example of an ozonation system according to the present disclosure, the ozonation system incorporates a recirculating, "on-demand" ozonation system. As discussed above, recirculating "on-demand" ozonation systems are designed with a tank that holds the aqueous solution and an ozonating flow path that recirculates ozonated solution back to the holding tank. The system ozonates the solution in the system regardless of whether ozonated solution is being dispensed. In such systems, ozone is continuously added to the aqueous solution to replace any ozone that has decomposed, or to ozonate any fresh solution that has been added to replace ozonated solution that has been removed from the system. A steady-state of ozonated solution is eventually reached based on the inlet and outlet flow rates, as well as the efficiency of the ozonating flow path used in the ozonation system.

Figure 2B:
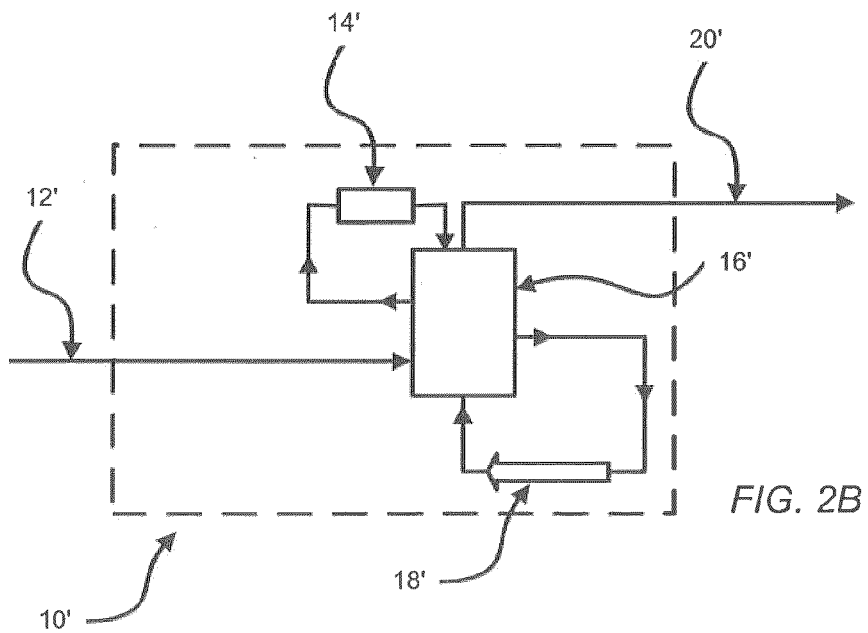
FIG. 2B is an illustration of another example of the system illustrated in FIG. 1.

One specific example such a recirculating, "on-demand" ozonation system is illustrated in FIG. 2B. The recirculating ozonation system 10' includes an inlet 12' for the aqueous solution, an acid-based cation-exchange resin 14' positioned in a recirculating flow path and adapted to treat the aqueous solution by replacing cations in the solution with $H^+$ ions and recirculate the aqueous solution back to a holding tank 16', the holding tank 16' is adapted to accept the aqueous solution from the inlet 12', an ozonating flow path 18' adapted to dissolve ozone in the aqueous solution and to recirculate the aqueous solution back to the holding tank 16', and outlet 20' adapted to dispense the treated ozonated aqueous solution from the system 10'.

A recirculating, "on-demand" ozonation system according to the present disclosure may incorporate the acid-based cation-exchange resin in a number of alternative locations, for example: directly in the ozonating flow path; in a recirculating flow path that, for example, recycles the solution from the holding tank to the cation-exchange resin and back to the holding tank (as illustrated in FIG. 2B); or in the holding tank itself. Alternatively, the ozonation system may include a holding tank that is adapted to accept an aqueous solution which has been treated with the acid-based cation-exchange resin, where the holding tank and the acid-based cation-exchange resin independently may or may not be a part of the ozonating flow path. For example, the aqueous solution may be treated in a first tank, which is not a part of the ozonating flow path, and the treated aqueous solution may then be moved into the holding tank, which is a part of the ozonating flow path. In another example, the aqueous solution may be treated with the acid-based cation-exchange resin by exposing the aqueous solution to the resin as the solution is pumped into the holding tank, where the holding tank is not a part of the ozonating flow path.

Non-recirculating, "On-demand" Ozonation Systems. In yet another example of an ozonation system according to the present disclosure, the ozonation system incorporates a non-recirculating, "on-demand" ozonation system. As discussed above, non-recirculating "on-demand" ozonation systems dispense ozone which has been added to the solution via a single pass through the ozonating flow path.

Figure 2C:
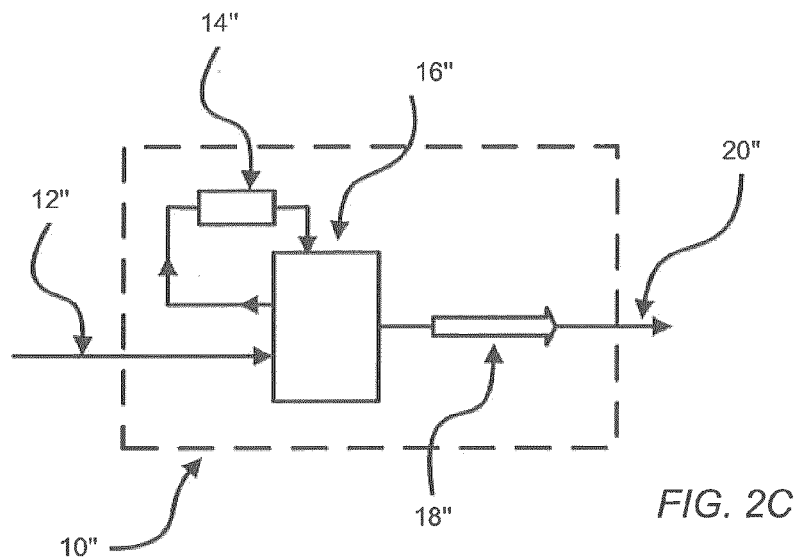
FIG. 2C is an illustration of yet another example of the system illustrated in FIG. 1.

One specific example of such a non-recirculating, "on-demand" ozonation system is illustrated in FIG. 2C. The non-recirculating ozonation system 10" includes an inlet 12" for the aqueous solution, an acid-based cation-exchange resin 14" positioned in a recirculating flow path and adapted to treat the aqueous solution by replacing cations in the solution with $H^+$ ions and recirculate the aqueous solution back to a holding tank 16", the holding tank 16" is adapted to accept the aqueous solution from the inlet 12", a non-recirculating ozonating flow path 18" adapted to accept the aqueous solution in the holding tank 16" and to dissolve ozone in the aqueous solution, and outlet 20" adapted to dispense the treated ozonated aqueous solution from the system 10". In the system illustrated in FIG. 2C, the ozonating flow path 18" is only activated when ozonated water is to be dispensed from the system 10", while the recirculation from the acid-based cation-exchange resin 14" to the holding tank 16" may operate continuously, intermittently, after aqueous solution has been added to the holding tank 16", or any other time that allows the resin 14" to replace cations in the solution with $H^+$ ions before the aqueous solution passes through the ozonating flow path 18".

Figure 2D:
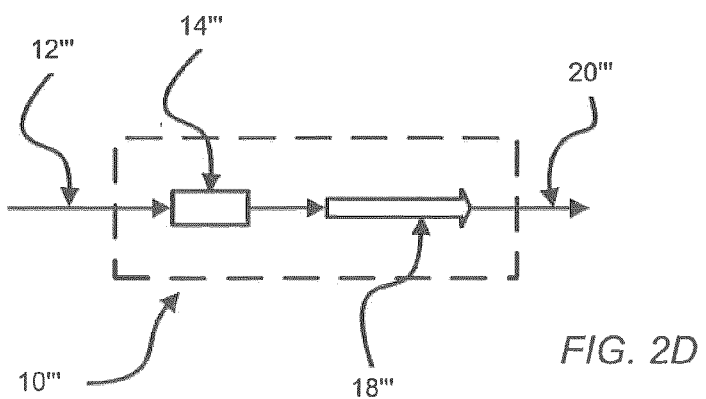
FIG. 2D is an illustration of still another example of the system illustrated in FIG. 1.

Another specific example of such a non-recirculating, "on-demand" ozonation system is illustrated in FIG. 2D. The non-recirculating ozonation system 10''' includes an inlet 12''' for the aqueous solution, an acid-based cation-exchange resin 14''' adapted to accept the aqueous solution from the inlet 12''' and to treat the aqueous solution by replacing cations in the solution with $H^+$ ions, a non-recirculating ozonating flow path 18''' adapted to accept the aqueous solution from the acid-based cation-exchange resin 14''' and to dissolve ozone in the aqueous solution, and outlet 20''' adapted to dispense the treated ozonated aqueous solution from the system 10'''.

A non-recirculating, "on-demand" ozonation system according to the present disclosure may incorporate the acid-based cation-exchange resin in a number of alternative locations, for example: directly in the ozonating flow path (as illustrated in FIG. 2D); in a recirculating flow path that, for example, recycles the solution from the holding tank to the cation-exchange resin and back to the holding tank (as illustrated in FIG. 2C); or in the holding tank itself. Alternatively, the ozonation system may include a holding tank that is adapted to accept an aqueous solution which has been treated with the acid-based cation-exchange resin, where the holding tank and the acid-based cation-exchange resin independently may or may not be a part of the ozonating flow path. For example, the aqueous solution may be treated in a first tank, which is not a part of the ozonating flow path, and the treated aqueous solution may then be moved into the holding tank, which is a part of the ozonating flow path. In another example, the aqueous solution may be treated with the acid-based cation-exchange resin by exposing the aqueous solution to the resin as the solution is pumped into the holding tank, where the holding tank is not a part of the ozonating flow path.

In one specific example, the aqueous solution may be treated with the acid-based cation-exchange resin by exposing the aqueous solution to the resin as the solution is pumped into the first tank. The treated aqueous solution may be kept in the first tank until a portion of the treated aqueous solution is needed, at which point the portion of the treated aqueous solution is then moved into the holding tank of an ozonated aqueous solution dispensing system, for example a hand-held sprayer. The ozonated aqueous solution dispensing system includes an ozonating flow path, of which the holding tank is a part. In such an example, the ozonation system according to the current application would include, at least, the acid-based cation-exchange resin, the first tank, the holding tank and the ozonating flow path.

Ozonating Flow Path

The ozonating flow path includes a source of ozone. The aqueous solution (for example water) flows at a desired flow rate though the ozonating flow path, ozone is added to the solution. As discussed in greater detail below, ozone may be added, for example, by adding ozone gas to the solution or by creating ozone directly in the ozonating flow path. In various exemplary ozonating flow paths according to the present application, the ozonating flow path includes a mixer, where ozone is added to the aqueous solution and is then mixed in the mixer.

Source of Liquid. It would be understood that the source of the liquid entering the ozonating flow path may be any source of liquid. For example, the source of the liquid may be a municipal water source, or a holding tank. The holding tank may be a part of the ozonation system, or may be separate from the ozonating system. If the holding tank is a part of the ozonating system, it may be a part of the ozonating flow path.

Sources of Ozone. Ozonating flow paths may use ozone gas provided to a liquid-gas mixer to generate the ozone-liquid mixture. The ozone gas can be provided from a number of different sources. For example, ozone may be added to the aqueous solution using ozone gas produced in a discharge-type ozone gas generator, for example a corona discharge ozone gas generator.

A corona discharge system uses an electrode with a high potential and takes oxygen gas and passes a current through the gas so as to ionize the gas and create a plasma around the electrode. The ionized gas recombines with oxygen to form ozone. The oxygen gas used in a corona discharge system can be oxygen from the air or from another oxygen source, for example the output from an oxygen concentrator. If air is used to generate ozone gas, a higher concentration of ozone can be achieved by reducing the amount of moisture in the provided air and/or increasing the concentration of oxygen (for example by removing nitrogen) in the provided air. Reducing the amount of moisture or increasing the concentration of oxygen can be achieved, for example, by using a removable cartridge, as described below. Corona discharge systems can use sustained ionization or intermittent ionization to generate ozone. Corona discharge typically uses two asymmetric electrodes: a highly curved electrode (e.g. tip of a needle or small diameter wire) and an electrode with a low curvature (e.g. a plate or ground). Coronas may be positive or negative, depending on the polarity of the voltage on the highly curved electrode. In particular embodiments, a negative corona discharge system is used. In some embodiments of known corona discharge systems, as much as 10 grams of ozone per hour can be provided.

Alternatively, ozone may be added to the aqueous solution using ozone produced by an electrolytic ozone generator. Such a generator produces ozone from the electrolytic break-down of water, or a liquid comprising water, thereby generating the ozone-liquid mixture without producing gaseous ozone. Electrolytic ozone generators are disclosed in U.S. Patent Publication 2008/0067078 to Kitaori published on Mar. 20, 2008; U.S. Pat. No. 5,407,550 to Shimamune issued on Apr. 18, 1995; U.S. Pat. No. 5,326,444 to Nakamatsu issued on Jul. 5, 1994; U.S. Pat. No. 5,900,127 to Iida issued on May 4, 1999; U.S. Patent Publication 2007/0212594 to Takasu published on Sep. 13, 2007, which are all incorporated herein by reference.

Mixer. The mixer used in the ozonating flow path may be, for example, a portion of the flow path downstream from the ozone generator, a temporary constriction in a flow path downstream from the ozone generator, or any other feature that causes turbulence in the fluid flow so as to decrease the size of the bubbles thereby increasing dissolution of ozone in the aqueous solution. In ozonating flow paths which use ozone gas produced by an ozone generator, the mixer can be, for example, a venturi and the ozone gas and aqueous solution may be mixed in the venturi.

A temporary constriction in a flow path increases the velocity of fluid passing through the constriction, thereby reducing the pressure downstream from the constriction and increasing the pressure upstream from the constriction. A temporary constriction generates turbulence in the fluid and increases dissolution of ozone in the fluid. When the source of ozone is an electrolytic ozone generator, it can be advantageous to use a temporary constriction in the flow path downstream from the electrolytic ozone generator in order to increase the fluid pressure in the electrolytic ozone generator since electrolytic ozone generators may operate more efficiently at increased pressures.

Another example of a feature that causes turbulence is a fluid pump. A fluid pump can be positioned in the ozonating flow path to draw the aqueous solution from a liquid inlet, which provides the aqueous solution to the ozonating flow path. The turbulence generated by the pump heads can break down the size of the ozone bubbles generated by the ozone source and increase dissolution of ozone in the aqueous solution.

Gas-Liquid Separator. The ozonating flow path may also include a gas-liquid separator which separates the gas-liquid mixture into degassed ozonated water and separated ozone gas. In such embodiments, the separated ozone gas may be destroyed in an ozone destructor and resulting oxygen gas may be vented to the atmosphere. Degassed ozonated water may be provided to a liquid outlet by the gas-liquid separator. Examples of different contemplated gas-liquid separators are discussed in U.S. Provisional Application 61/409,274 (filed Nov. 2, 2010), which is incorporated herein by reference.

Flow Paths. Ozonating flow paths, for example flow paths which include either corona discharge systems or electrolytic ozone generators to produce ozone, may be configured in a variety of different ways in order to provide ozone to the aqueous solution.

For example, the electrolytic ozone generator may be positioned in a fluid flow path parallel to the main fluid flow path. In such an ozonating flow path, the parallel fluid flow path that includes the electrolytic ozone generator may flow at a lower flow rate than the fluid flowing at the liquid inlet of the ozonating flow path or the liquid outlet of the ozonating flow path. The relationship between ozone concentration and fluid flow rate is non-linear with electrolytic ozone generators and reducing the flow rate results in increased ozone concentration. Diverting a portion of the fluid flow away from the main fluid flow path results in a reduced flow rate through that parallel fluid flow path; placing the electrolytic ozone generator in the side stream with the reduced flow rate may result in increased ozone concentration when compared to the ozone concentration associated with an electrolytic ozone generator positioned in the main fluid flow path. Since the relationship between ozone concentration and fluid flow rate is non-linear, the overall amount of ozone generated in the system can be increased when the electrolytic ozone generator is positioned in a parallel side stream with reduced flow rate.

In another example, the ozonating flow path may include a first liquid inlet and a second liquid inlet, where the first liquid inlet accepts a first portion of liquid into the ozonating flow path in a first flow path at a first flow rate, and the second liquid inlet accepts a second portion of liquid into the ozonating flow path in a second flow path at a second flow rate. The first and second flow paths merge into a dispensing flow path. The first and second flow rates may be chosen to optimize the ozone concentration of the liquid dispensed from the liquid outlet of the dispensing flow path. Ozonating flow paths may, alternatively, include more than the two liquid inlets.

Components. Any of the ozonating flow paths discussed above may include more than one source of ozone, and/or may additionally include one or more oxidation reduction potential (ORP) sensors, one or more liquid-liquid mixers, one or more dosing pumps, one or more gas-liquid separators, one or more ozone destructors, or any combination thereof. Examples of different contemplated ozonating flow paths which include components noted above are discussed in U.S. Provisional Application 61/409,274 (filed Nov. 2, 2010), which is incorporated herein by reference.

Figure 3A:
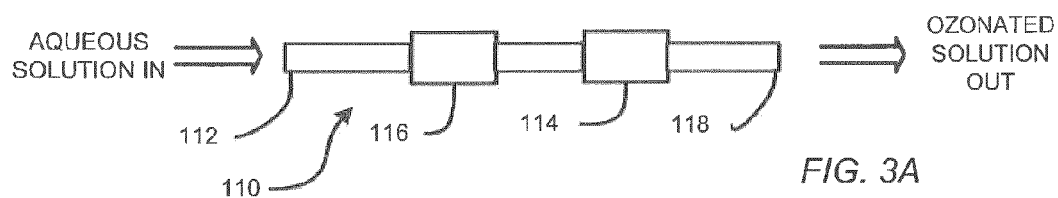
FIG. 3A is an illustration of an example of an ozonating flow path which may be used in a system according to the present disclosure.
Figure 3B:
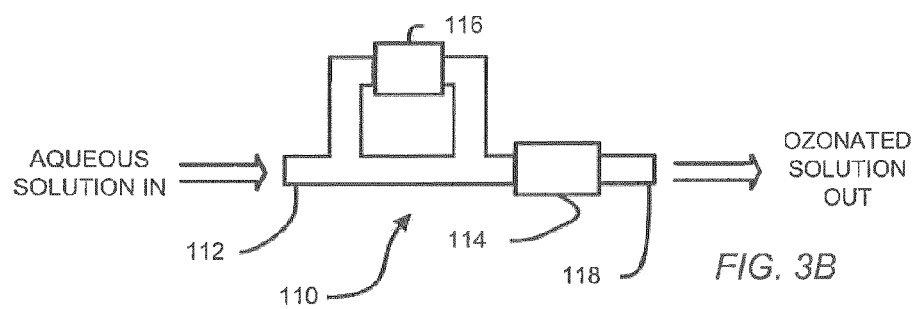
FIG. 3B is an illustration of another example an ozonating flow path which may be used in a system according to the present disclosure.
Figure 3C:
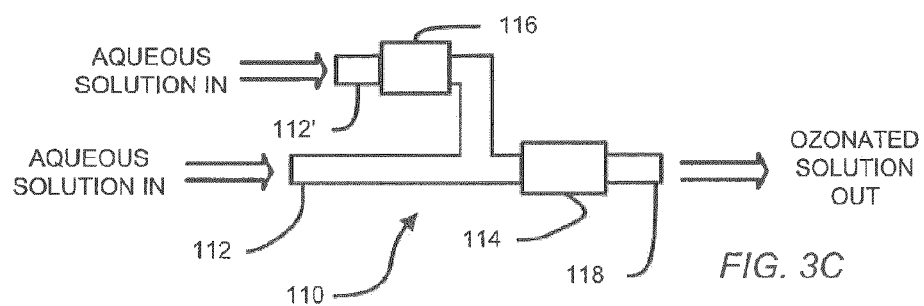
FIG. 3C is an illustration of a further example of an ozonating flow path which may be used in a system according to the present disclosure.

Exemplary Ozonating Flow Paths. Exemplary ozonating flow paths are illustrated in FIGS. 3A-3C. These exemplary ozonating flow paths may be incorporated into any of the ozonating systems discussed above, for example the ozonating systems illustrated in FIGS. 2A-2D.

In the exemplary ozonating flow path 110 illustrated in FIG. 3A, liquid inlet 112 is arranged to accept an aqueous solution to be ozonated into the ozonating flow path. The liquid inlet 112 accepts the aqueous solution directly into the ozonation flow path. The liquid inlet 112 accepts the aqueous solution as long as an ozonated solution is being produced. The aqueous solution flows at a desired flow rate though the ozonating flow path and is mixed with ozone in mixer 114. Ozone is added to the flow path 110 using an electrolytic ozone generator 116 which produces ozone from the electrolytic break-down of water. In the flow path illustrated in FIG. 3A, the electrolytic ozone generator 116 is in line with liquid inlet 112 and breaks down water accepted to the flow path through liquid inlet 112. Liquid outlet 118 dispenses ozonated liquid at the desired flow rate (e.g. for use by an end user). The flow rate out of the liquid outlet 118 is substantially the same as the flow into the liquid inlet 112 since the flow in is directly dependent on the flow out and liquid accepted by the flow path displaces liquid within the flow path.

The exemplary ozonating flow path illustrated in FIG. 3B parallels the flow path illustrated in FIG. 3A, but positions the electrolytic ozone generator 116 in a fluid flow path parallel to the main fluid flow path. The parallel fluid flow path that includes the electrolytic ozone generator 116 would flow at a lower flow rate than the fluid flowing at the liquid inlet 112 or the liquid outlet 118. The relationship between ozone concentration and fluid flow rate is non-linear with electrolytic ozone generators and reducing the flow rate results in increased ozone concentration. Diverting a portion of the fluid flow away from the main fluid flow path results in a reduced flow rate through that parallel fluid flow path; placing the electrolytic ozone generator 116 in the side stream with the reduced flow rate can result in increased ozone concentration when compared to the ozone concentration associated with an electrolytic ozone generator positioned in the main fluid flow path. Since the relationship between ozone concentration and fluid flow rate is non-linear, the overall amount of ozone generated in the system can be increased when the electrolytic ozone generator 116 is positioned in a parallel side stream with reduced flow rate.

The exemplary ozonating flow path illustrated in FIG. 3C parallels the flow path illustrated in FIG. 3B, but includes a first liquid inlet 112 and a second liquid inlet 112', where the first liquid inlet 112 accepts a first portion of liquid into the ozonating flow path in a first flow path at a first flow rate, and second liquid inlet 112' accepts a second portion of liquid into the ozonating flow path in a second flow path at a second flow rate. The first and second flow paths merge into a dispensing flow path. The first and second flow rates of the ozonating flow path illustrated in FIG. 3C can be chosen to optimize the ozone concentration of the liquid dispensed from liquid outlet 118. Other embodiments of the ozonating flow path could include more than the two liquid inlets illustrated in FIG. 3C.

Method

Methods and systems according to the present description may treat the aqueous solution to be ozonated using the acid-based cation-exchange resin before or after exposing the treated aqueous solution to ozone in order to generate the treated, ozonated liquid which is dispensed from the liquid outlet.

Figure 4A:
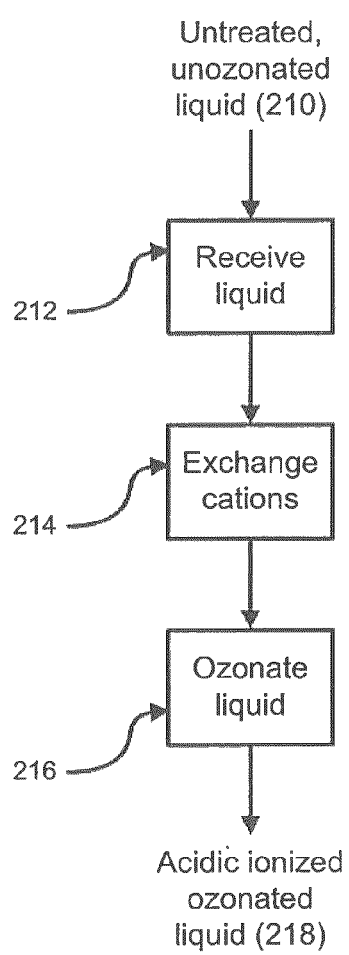
FIG. 4A is an illustration of a method for providing ozonated liquid according to the present disclosure.

One example of a method according to the present description is illustrated in FIG. 4A. Untreated, unozonated liquid 210 is received at 212 and cations present in the received liquid are exchanged with $H^+$ ions at 214 using an acid-based cation-exchange resin. The resulting liquid is ozonated at 216 to produce acidic ionized ozonated liquid 218.

Figure 4B:
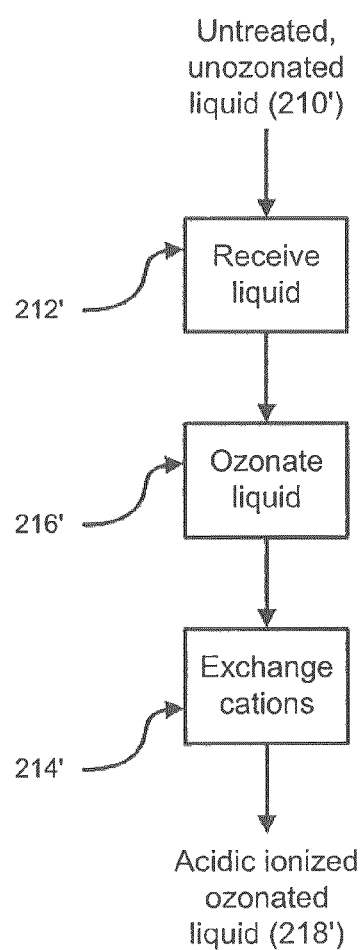
FIG. 4B is an illustration of another method for providing ozonated liquid according to the present disclosure.

In another example, illustrated in FIG. 4B, untreated, unozonated liquid 210' is received at 212' and ozonated at 216' to produce ozonated liquid. Cations present in the ozonated liquid are exchanged with $H^+$ ions at 214' using an acid-based cation-exchange resin to produce acidic ionized ozonated liquid 218'.

This written description uses examples to disclose the invention, including the best mode, and also to enable any person skilled in the art to practice the invention, including making and using any devices or systems and performing any incorporated methods. The above-described examples are intended to be for illustration only. Alterations, modifications, and variations can be effected to the particular examples by those of skill in the art without departing from the scope of the invention.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for increasing the average life span of ozone dissolved in a liquid, the system comprising:
    a liquid inlet arranged to accept a liquid into the system;
    an acid-based cation-exchange resin in fluid communication with the liquid inlet, the resin adapted to exchange cations in the accepted liquid with H+ions on the resin to treat the liquid;
    an ozone dissolving apparatus in fluid communication with the liquid inlet and the acid-based cation-exchange resin; and
    a liquid outlet in fluid communication with the liquid inlet, the acid-based cation- exchange resin and the ozone dissolving apparatus, the ozone dissolving apparatus and the acid-based cation-exchange resin cooperating to increase the average life span of the ozone dissolved in the liquid in comparison to an untreated liquid at the same pH and to produce an acidic ionized ozonated liquid for dispensing out of the system via the liquid outlet.

2. The system according to claim 1 wherein the ozone in the dispensed ozonated liquid has an average life span which is:
    greater than the average life span of ozone in liquid which is not treated with the acid-based cation-exchange resin and is treated with sufficient liquid acid to produce a pH equal to the pH of the dispensed acidic ionized ozonated liquid; and
    greater than the average life span of ozone in a deionized liquid which is treated with sufficient liquid acid to produce a pH equal to the pH of the dispensed acidic ionized ozonated liquid.

3. The system according to claim 1 wherein the ozone dissolving apparatus is an ozonating flow path which comprises:
    an ozone generator to produce ozone for mixing with the accepted liquid.

4. The system according to claim 3, wherein the ozonating flow path further comprises a mixer, in fluid communication with the ozone generator, to mix the generated ozone and the accepted liquid to produce the ozonated liquid.

5. The system according to claim 1 wherein the system further comprises a holding tank and wherein the acid-based cation-exchange resin is located in a recirculating flow path that is adapted to recirculate liquid to the holding tank.

6. The system according to claim 1 wherein the system further comprises a holding tank and wherein the acid-based cation-exchange resin is located in the holding tank.

7. The system according to claim 1 wherein the acid-based cation-exchange resin is located in a non-recirculating flow path.

8. The system according to claim 7 wherein the system further comprises a holding tank and the non-recirculating flow path provides liquid to the holding tank.

9. The system according to claim 7 wherein the non-recirculating flow path provides liquid to the ozone dissolving apparatus.

10. The system according to claim 1 wherein the acid-based cation-exchange resin accepts liquid from the liquid inlet and the ozone dissolving apparatus accepts liquid treated by the resin.

11. The system according to claim 1 wherein the ozone dissolving apparatus accepts liquid from the liquid inlet and the acid-based cation-exchange resin accepts the ozonated liquid.

12. The system according to claim 1 wherein the acid-based cation-exchange resin is a strong acid resin.

13. The system according to claim 1 wherein the acid-based cation-exchange resin is a weak acid resin.

14. The system according to claim 1, wherein the cations in the accepted liquid are present in the liquid when the liquid is accepted by the ozonation system, or are added to the liquid by the ozonation system.

15. A method of increasing the average life span of ozone dissolved in a liquid, the method comprising:
    receiving a liquid;
    exchanging cations present in the liquid with H+ions from an acid-based cation-exchange resin to treat the liquid; and
    ozonating the liquid by mixing ozone with the liquid;
    wherein exchanging the cations and ozonating the liquid together increase the average life span of the ozone dissolved in the liquid in comparison to an untreated liquid at the same pH and produce an acidic ionized ozonated liquid.

16. The method according to claim 15 wherein the cations are exchanged to produce an acidic ionized liquid, and the acidic ionize liquid is ozonated after the cations are exchanged.

17. The method according to claim 15 wherein the received liquid is ozonated before the cations are exchanged.

18. The method according to claim 15 wherein the ozone in the ozonated liquid has an average life span which is:

greater than the average life span of ozone in liquid which is not treated with the acid-based cation-exchange resin and is treated with sufficient liquid acid to produce a pH equal to the pH of the acidic ionized ozonated liquid; and greater than the average life span of ozone in a deionized liquid which is treated with sufficient liquid acid to produce a pH equal to the pH of the acidic ionized ozonated liquid.

19. The method according to claim 15, further comprising adding cations to the received liquid before the cations are exchanged.

20. The system according to any one of claims 1 to 14, wherein the ozone dissolving apparatus is an ozonating flow path which comprises an electrolytic ozone generator to produce ozone for mixing with the accepted liquid, and wherein the electrolytic ozone generator is adapted to perform electrolytic treatment of the cation exchange resin-treated liquid only.

21. The method according to any one of claims 15 to 19, wherein ozonating the liquid comprises generating ozone using an electrolytic ozone generator adapted to perform electrolytic treatment of the cation-exchange resin-treated liquid only.

22. The system according to any one of claims 1 to 14, wherein the ozone dissolving apparatus is an ozonating flow path which comprises a discharge-type ozone gas generator to produce ozone for mixing with the accepted liquid.

23. The system according to claim 22, wherein the discharge-type ozone gas generator is a corona-discharge ozone gas generator.

24. The method according to any one of claims 15 to 19, wherein ozonating the liquid comprises generating ozone using a discharge-type ozone generator.

25. The method according to claim 24, wherein the discharge-type ozone gas generator is a corona-discharge ozone gas generator.

\* \* \* \* \*